United States Patent
Lundin (10) Patent No.: US 6,623,667 B2
(45) Date of Patent: Sep. 23, 2003

(54) METHOD FOR CONTINUOUS FABRICATION OF STRUCTURED SURFACE LIGHT GUIDES

(75) Inventor: David Jon Lundin, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 234 days.

(21) Appl. No.: 09/796,144

(22) Filed: Feb. 28, 2001

(65) Prior Publication Data

US 2002/0163094 A1 Nov. 7, 2002

(51) Int. Cl.[7] .............................................. B29D 11/00
(52) U.S. Cl. ........................ 264/1.27; 264/1.6; 264/166; 425/371
(58) Field of Search ................................ 264/1.24, 1.6, 264/2.7, 1.27, 166, 167; 425/363, 371

(56) References Cited

U.S. PATENT DOCUMENTS

| | | |
|---|---|---|
| 3,601,848 A | 8/1971 | Zippel, Jr. |
| 3,689,346 A | 9/1972 | Rowland |
| 4,755,334 A | 7/1988 | Grimm et al. |
| 5,139,730 A | 8/1992 | Holso et al. |
| 5,164,204 A | 11/1992 | Weppert et al. |
| 5,167,781 A | 12/1992 | Kemerer et al. |
| 5,393,211 A | 2/1995 | Hegler et al. |
| 5,432,876 A | 7/1995 | Appeldorn et al. |
| 5,505,599 A | 4/1996 | Kemer et al. |
| 5,700,495 A | 12/1997 | Kemer et al. |
| 5,744,091 A | 4/1998 | Lupke |
| 5,773,044 A | 6/1998 | Dietrich et al. |
| 6,039,553 A | 3/2000 | Lundin et al. |
| 6,077,462 A | 6/2000 | Lundin et al. |
| 6,110,401 A | 8/2000 | Lee et al. |

FOREIGN PATENT DOCUMENTS

| | | |
|---|---|---|
| JP | 95082349 | 3/1995 |
| JP | 11348093 | 12/1999 |

OTHER PUBLICATIONS

Journal of Advanced Materials, Development of a Continuous Liquid Composite Molding Process and Prototype Process Machine, William R. Barron, Oct 10, 1994.

Primary Examiner—Mathieu D. Vargot
(74) Attorney, Agent, or Firm—Stephen W. Buckingham (57) ABSTRACT

A method of fabricating an elongate light guide includes providing a moving mold assembly with at least two mold parts, wherein the mold parts have an engaged portion and a non-engaged portion. The mold parts are moved such that the non-engaged portions move in a first direction and the engaged portions move in a second direction different from the first direction to form an elongate regenerated mold cavity having a longitudinal axis, wherein the cavity comprises a molding surface with at least one structure transverse to the longitudinal axis. A thermosettable material is introduced into the cavity and at least partially polymerized in the cavity to form a light guide therein. The light guide is then removed from the mold assembly.

13 Claims, 6 Drawing Sheets

*Fig. 6b*

METHOD FOR CONTINUOUS FABRICATION OF STRUCTURED SURFACE LIGHT GUIDES

TECHNICAL FIELD

This invention relates to methods for manufacture of light guides with structured surfaces, and more particularly to continuous or semi-continuous methods for manufacturing light guides with structured surfaces.

BACKGROUND

Extrusion methods may be used to continuously manufacture an article using a thermoplastic resin feed. While extrusion processes are well adapted to melt process thermoplastic materials into articles with relatively smooth surface profiles, they are less suitable for creating articles having surface profiles with precision structures oriented in a direction transverse to a plane of a major surface of the article. In an extrusion process, the resin extrudate is still molten and soft as its exits the die, and the final surface profile of the article may change as the article cools. This profile change may be particularly troublesome if it is manifested as a volume change due to shrinkage as the resin cools, particularly if the volume change is large compared to the dimensions of the precision transverse structures on the major surface of the article.

Injection molding may also be used to manufacture articles having precision transverse surface profile structures using a thermoplastic resin feed. As the molten thermoplastic is injected into a mold cavity and contacts the raised or depressed structures oriented transverse to the longitudinal axis of the mold surface, the resin cools and forms a skin-like layer adjacent the mold surface. This skin-like layer prevents further flow at the mold surface, and the molten resin must be forced into the mold cavity at high pressure to fully fill the mold cavity. As a result, the contact between the thermoplastic and the transverse structures in the mold is not reliable, and it is difficult to replicate the structures with a high level of precision. In addition, since the injection molding process typically requires heating the resin feed to fill the mold, the molded article may shrink significantly when cooled.

For example, light transmitting articles such as light guides and light fibers often feature precise surface profile structures. These light transmitting articles are commonly manufactured using a thermoplastic extrusion or injection molding process. A light guide typically includes at least one surface adapted to receive light from a light source and an optically smooth surface for reflecting light propagating through the light guide. Common examples include optical fibers used in data communication and planar wave guides used in optical displays. A light fiber, commonly used in illumination systems, receives light in at least one end and transmits the light out of the fiber at a predetermined position or positions along the length of the fiber.

A typical light transmitting device is the light guide, which may be likened to a length of conventional optical fiber. Such a fiber generally has a core with a particular cross-sectional geometry (i.e., circular, elliptical, etc.) and a cladding on the core. The refractive index of the core is greater than the refractive index of the cladding. In use, a beam of electromagnetic energy, such as visible light, introduced into the core at one end of the fiber will always strike the core/cladding interface at an angle greater than the critical angle and so will be totally internally reflected. As a result, the light will be transmitted to the other end of the fiber without significant losses. See, for example, U.S. Pat. No. 5,898,810.

To extract light in a controlled manner from a light transmitting article, multiple light extraction structures may be formed in a direction transverse to a direction of light propagation in the article. The light extraction structures may be positive, projecting above a plane through which the light propagates in the light transmitting article, or negative, projecting below the plane of light propagation. Typically, the light transmitting article has an elongated shape, the light travels along a longitudinal axis of the article, and the light extraction structures are formed transverse to the longitudinal axis. At each structure, light is reflected at an angle that is less than the critical angle necessary for continued propagation along the article according to the principle of total internal reflection, which causes the light to exit the article.

The negative structures may be machined directly into the surface of the light transmitting article, and positive or negative structures may be imparted to the article in a batch molding process using a rigid or flexible mold. However, precision machining of the polymeric materials commonly used to make the light transmitting articles is time consuming, inaccurate and expensive. Likewise, other batch processing techniques may be difficult to conduct in a commercially feasible time period.

A continuous process for fabricating and then adhering a light-extracting structure to a light guide has been described in U.S. Pat. No. 6,039,553. In a first step, a continuous molding process for making a light transmitting article forms a molded layer with surface profile structures. In a second step, the molded layer is adhered to a light guide so that the structures are transverse to the direction of light propagation in the light guide. This continuous molding process more effectively replicates the structures needed to form a particular surface profile than conventional extrusion, injection molding and machining techniques, but the required two step molding procedure leaves an interface where the bonded layer is attached to the prefabricated light guide. Even if the bonded layer and the light guide are refractive index matched and aligned with great precision, the interface between the bonded layer and the light guide may interfere with the efficiency and precision of light transmission and/or extraction from the light transmitting article.

SUMMARY

Currently, to impart precise structures into a surface of an article, the structures are machined into the surface of the article, the article is molded using a batch process, or the structures are applied to a surface of the article in a separate molding step. Conventional single step continuous extrusion and injection molding processes do not provide sufficiently accurate replication of surface profile structures transverse to a plane of a major surface of the article.

The invention is a continuous process for making an elongate light guide having surface profile structures arranged in a direction transverse to the longitudinal axis of the light guide. In the process of the invention, a liquid thermosettable material is introduced into a closed mold cavity having a molding surface with positive or negative structures oriented transversely to the longitudinal axis of the molding surface. During the molding process, as the thermosettable material undergoes polymerization to form a thermoset light guide, the structures in the mold are precisely imparted to a surface of the light guide in a single step.

In the process of the invention the liquid thermosettable material may be applied to the mold at a moderate temperature and a pressure selected to ensure that the liquid flows easily over or into the structures on the molding surface. The thermosettable material intimately and substantially uniformly contacts the structures in the mold, so that the transverse surface profile structures may be more precisely replicated than in conventional extrusion or injection molding processes. The moderate molding temperature decreases or substantially eliminates shrinkage of the fully or partially polymerized light guide. The process of the invention reduces cycle time and makes manufacture of the light guides more commercially feasible than conventional batch or multi-step molding processes.

The process of the invention is particularly well suited to the continuous, rapid manufacture of light transmitting articles such as light guides that include multiple light extraction structures in a direction transverse to a direction of light propagation in the light guide. The light extraction structures may be positive, projecting above a plane through which the light propagates in the light guide, or negative, projecting below the plane of light propagation. Typically, the light guide has an elongated shape, the light travels along a longitudinal axis of the light guide, and the light extraction structures are formed transverse to the longitudinal axis.

In one aspect, the invention is a method of fabricating an elongate light guide, including:

(a) providing a moving mold assembly comprising at least two mold parts, wherein the mold parts have an engaged portion and a non-engaged portion;

(b) moving the mold parts such that the non-engaged portions move in a first direction and the engaged portions move in a second direction different from the first direction to form an elongate regenerated mold cavity having a longitudinal axis, wherein the cavity comprises a molding surface with at least one structure transverse to the longitudinal axis;

(c) introducing a thermosettable material into the cavity;

(d) at least partially polymerizing the thermosettable material in the cavity to form a light guide therein; and, (e) removing the light guide from the mold assembly.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

In one embodiment, the invention is a method of making a molded light guide from a thermosettable material. The light guide is molded in an apparatus with at least two flexible, engagable mold portions that move together to form an elongate mold cavity. The cavity thus formed is filled with a thermosettable material while, at the same time, the engaged mold portions are moving away from a point of engagement. At least one of the mold portions includes molding features (concave or convex) that are transverse to a longitudinal axis of the mold.

Figure 1:
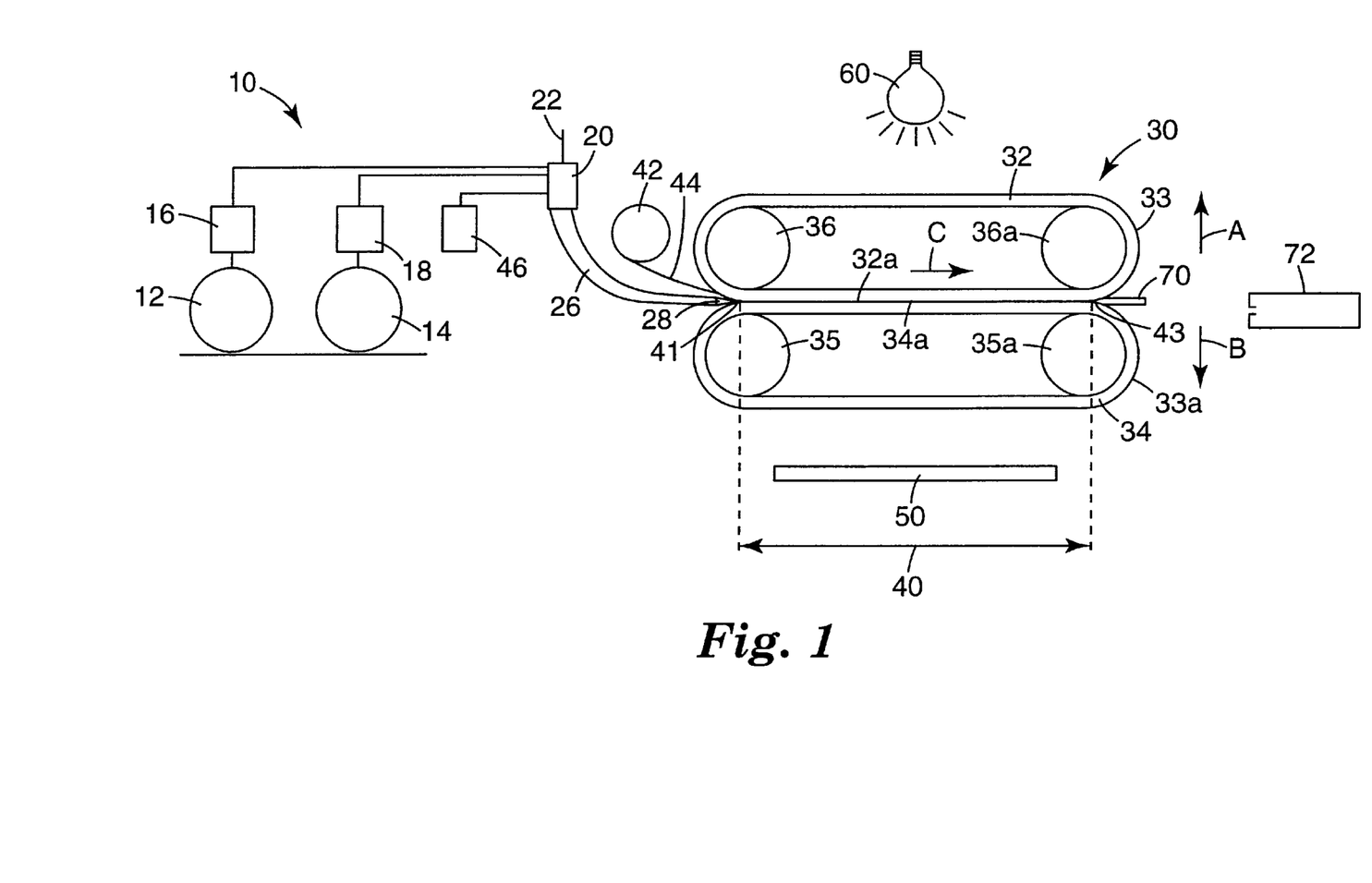
FIG. 1 is a schematic overhead view of an apparatus for conducting the molding process of the invention.

An embodiment of an apparatus 10 for conducting the process of the invention is illustrated schematically in FIG. 1. The apparatus 10 includes an appropriate number of vessels 12 and 14 that contain the reactive components required to form a thermosettable material. The thermosettable material is fed by flow metering pumps 16 and 18, respectively, to an optional mixing chamber 20 equipped with an optional stirring device 22. The thermosettable material flows through a feed pipe 26 with a nozzle 28, and into a moving mold assembly 30. The feed pipe 26 may also optionally include a static mixer (not shown in FIG. 1).

The mold assembly 30 includes a pair of engagable molding belts 32 and 34, which are capable of continuous circulation around driving and guiding rollers 35, 35a, 36, and 36a. During circulation, a non-engaged portion 33, 33a of each molding belt 32, 34 moves in direction A and B, respectively. An engaged portion 32a, 34a of each belt 32, 34 moves in a different direction C. Typically, directions A and B are normal to direction C. The movement of the molding belts 32, 34 is preferably continuous, but may also be discontinuous or stepwise as required for a particular application. The molding belts are preferably continuous, but may also be formed from linked individual mold parts disposed on an endless circulating belt.

Figure 2:
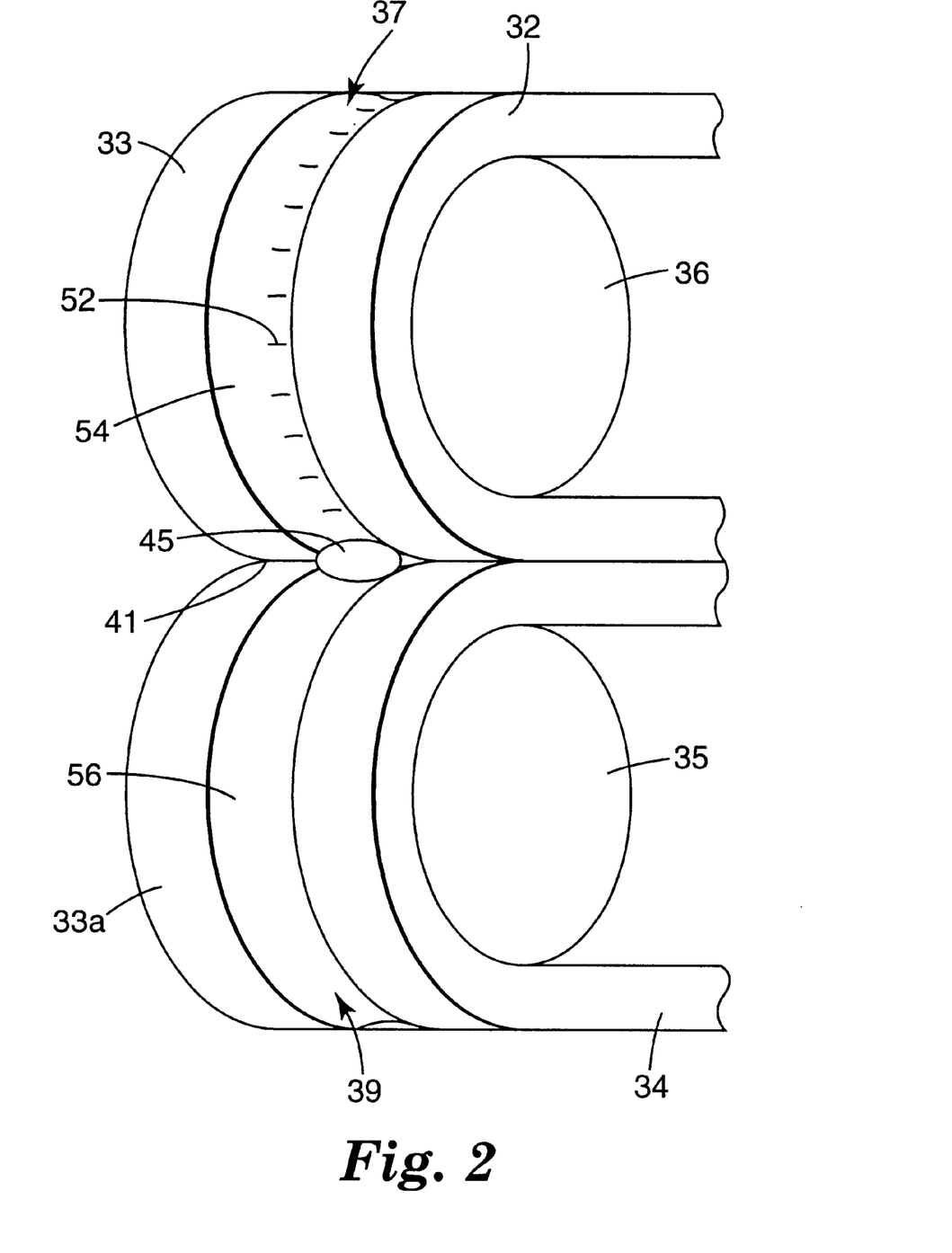
FIG. 2 is a perspective view of a mold that may be used in the process of the invention.

Referring also to FIG. 2, each of the molding belts 32, 34 include engagement surfaces 33, 33a, respectively, with a molding cavity 37, 39. The cross-sectional shape of the cavities 37, 39 is selected such that when the engaged portions 32a, 34a of each belt move in direction C, the engagement surfaces 33, 33a come together at a first end 41 of a molding zone 40. The cavities 37, 39 cooperate to form an enclosed, open-ended mold region 45. The sidewall shapes of the molding cavities 37, 39 may be individually tailored to determine the overall cross sectional shape of the closed mold region 45. The cross sectional shape of the closed mold region 45 corresponds to the cross sectional shape of the article to be molded, and may vary widely depending on the intended use of the article. Preferably, the cross sectional shape is circular.

Figure 3:
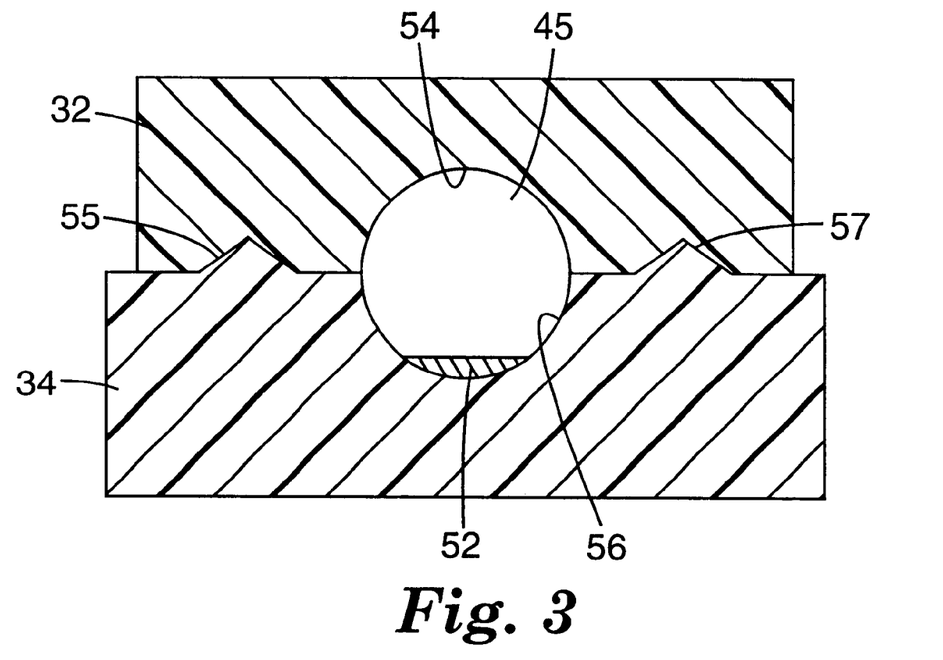
FIG. 3 is a cross sectional view of a mold that may be used in the process of the invention.

The molding cavities 37, 39 include respective molding surfaces 54, 56, at least one having an arrangement of surface profile structures 52. The structures 52 have at least one surface oriented transverse to a plane of the molding surfaces 54, 56. In the case of an elongated light guide, the structures 52 have at least one surface transverse to a longitudinal axis of the light guide. Referring to FIG. 3, the structures 52 may be positive and extend above a plane of the molding surface 54, 56. The molding belts 32, 34 may also include alignment flanges 55, 57 and corresponding grooves to maintain accurate registration during continuous operation.

For example, published application WO 98/29516 and U.S. Pat. No. 5,650,215, incorporated herein by reference, describe various structures 52 that may be used in the molding surfaces 54, 56. The shapes and distribution of the structures 52 may vary widely depending on the intended end use application of the article to be molded. Preferred shapes for the structures 52 include hemispheres, pyramids (such as cube corners, tetrahedral, etc.), and "V" grooves. The structures may be macroscopic or microscopic, and may have heights or depths above or below a plane of the molding surface ranging from about 1 μm up to about 99% of the thickness of the light guide, preferably less than about 50% of the thickness of the light guide.

Referring again to FIG. 1, the closed mold region is maintained throughout the molding zone 40 while the molding surfaces 33, 33a are adjacent one another. The thermosetting material may be at least partially polymerized in the molding zone 40 by, for example, chemical means, heat from a heater 50, and/or ultraviolet (UV) light by a light source 60. The polymerization rate for the thermosettable material is adjusted such that the thermoset molded light guide 70 at least substantially retains its shape at a second end 43 of the molding zone 40. Typically, the speed of the continuously circulating belts, the rate of introduction of the thermosettable material, and the temperature are selected such that the light guide 70 is at least partially polymerized while in the molding zone 40. Complete polymerization may optionally take place outside the molding zone on a take up roll (not shown in FIG. 1) or in an oven 72.

Optional storage rolls 42 may be used to introduce films, tapes, reflective material, glass fibers and the like 44 to the molding process for bonding to or inclusion in the molded light guide 70. Other optional materials, such as reflective particles, pigments, and the like may be drawn from a storage vessel 46 and introduced into the mixing chamber 20 to form a uniform blend with the thermosettable material. The blended material may then be introduced into the molding zone 40.

Figure 4:
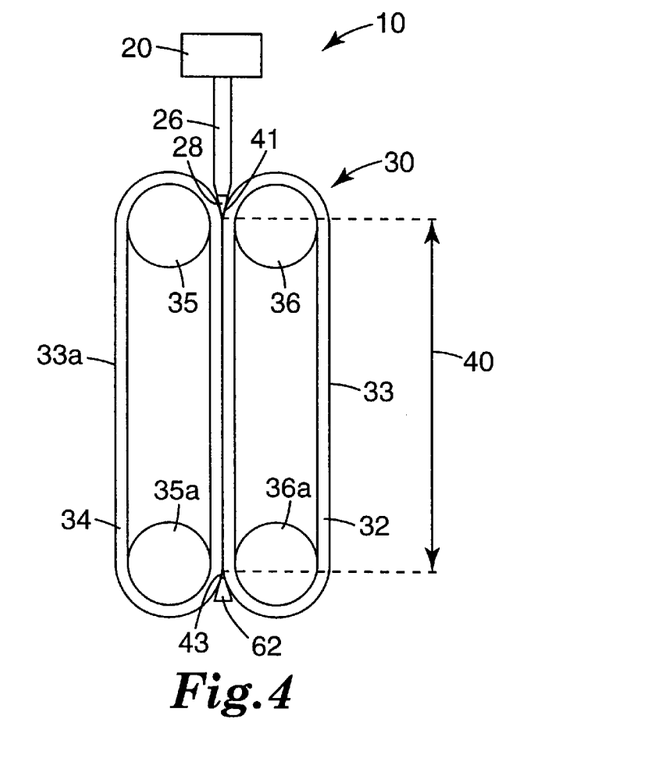
FIG. 4 is a schematic overhead view of an apparatus for conducting the molding process of the invention.

Referring to FIG. 4, an alternative embodiment of the apparatus 10 is shown in which an optional plug 62 is placed at the downstream end 43 of the molding zone 40 to allow filling of the closed mold region 45 prior to full or partial polymerization of the thermosettable material.

Figure 4A:
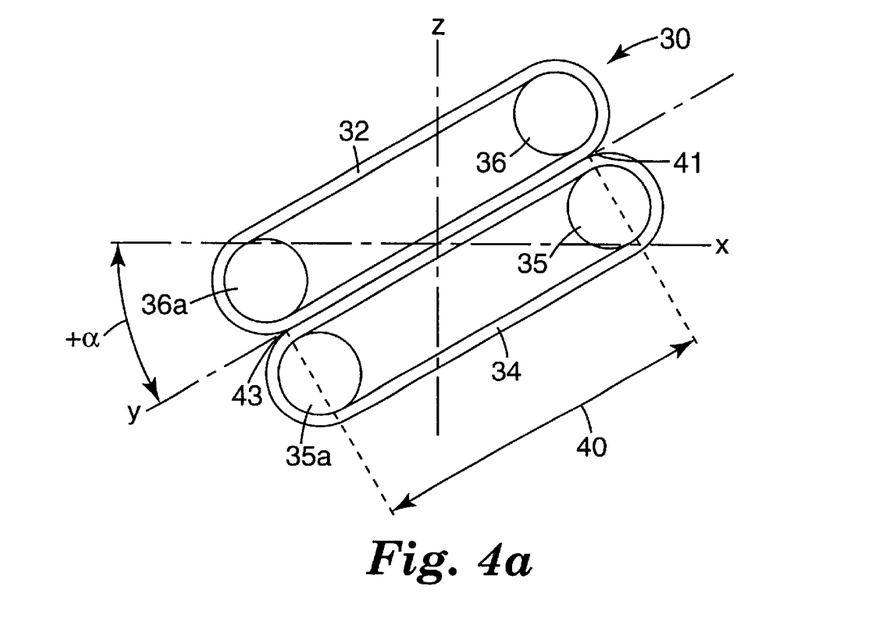
FIG. 4(a) is a perspective view of an apparatus for conducting the molding process of the invention.

Referring to FIG. 4(a), the mold 30 is shown residing in the x-y plane. However, to reduce air entrapment and bubble formation as the thermosettable material is introduced into the first end 41 of the molding zone 40, it is preferred that the molding apparatus 30 be inclined at an angle +α of about 15° to about 45° above the x-y plane so that the first end 41 of the closed mold region 45 is above the second end 43 of the closed mold region. Inclination of the molding apparatus 30 also allows the thermosettable material to more completely fill all the cavities in the closed mold region 45 prior to polymerization. This is particularly important if the structures in the closed mold region 45 are complex and/or microscopic, or if the thermosettable material is very viscous prior to polymerization.

The thermosettable material used in the process of the invention may be any known thermosettable material. The term thermosettable as used in this application means a polymerizable material in liquid form that, when fully or partially polymerized by application of at least one of heat, chemicals, or exposure to radiation, changes into a substantially infusible and insoluble thermoset material. Thermosettable materials are to be distinguished from thermoplastic materials. Thermoplastic materials are fully polymerized materials that change physically rather than chemically when heated. The thermosettable material may be selected from any polymeric material than can be introduced into the closed mold region 45 and at least partially polymerized in a commercially feasible time under temperature or pressure conditions that do not adversely affect the molding belts 32, 34. In addition, the resulting thermoset article should preferably have acceptable properties consistent with its intended use such as, for example, dielectric properties, opacity or heat resistance. Suitable thermosettable materials include acrylates, urethanes, and silicones.

The thermosettable material is preferably selected from materials that do not significantly shrink upon polymerization and hardening. If the thermosettable material shrinks as it hardens, the material may pull away from the structures 52 during the polymerization process, which results in poor replication of the structures in the finished molded article. If the thermosettable material contracts during full or partial polymerization, the thermosettable material may be injected into the closed molding region under pressure.

The thermosettable material is in liquid form when introduced into the closed mold region 45 so that the material is capable of fully wetting the molding surfaces 54, 56, flowing around and/or filling the structures 52, and filling the closed mold region 45. Referring to FIGS. 1–2, the thermosettable material may be composed of polymerizable reactants mixed in the mixing chamber 20, or mixed in the closed mold region 45. The shape of the molding surfaces and the structures may have an impact on the method of introduction of the thermosettable material into the closed mold region 45. For example, if the structures have a relatively high aspect ratio, care may be required to prevent the formation of bubbles in the thermosettable material prior to achieving full or partial polymerization. If bubbles form, they may nucleate or become trapped near the structures in the molding surface, which may cause imprecise replication of the structures in the light guide. Bubble formation may be minimized by reducing the rate at which the liquid thermosettable material is introduced into the closed mold region, and/or by selecting a liquid thermosettable material with a lower viscosity. Bubble formation may also be reduced by submerging the nozzle tip 28 (FIG. 1) in the thermosettable material as it enters the closed mold region 45.

The temperature and pressure at which the polymerization process is conducted may vary widely depending on the thermosettable material used, the structures to be molded, and the cross sectional shape of the light guide. Typically, the process of the invention is conducted at ambient temperature and pressure.

Figure 5A:
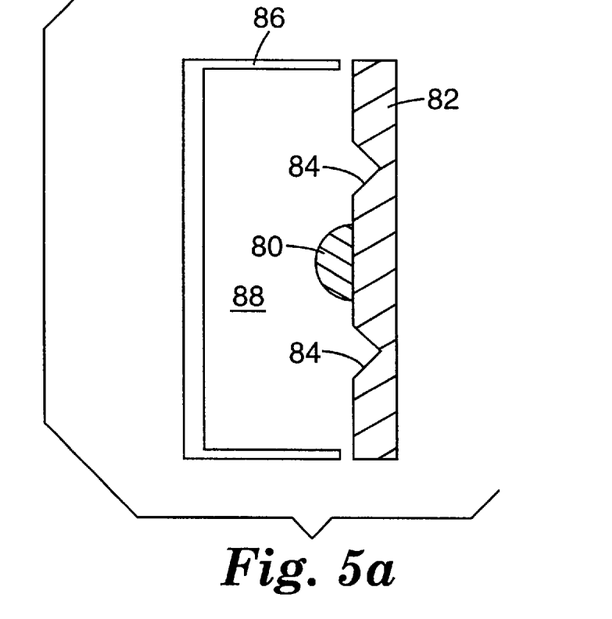
FIGS. 5(a) and 5(b) are a schematic representation of a process for making the mold used in the process of the invention.
Figure 5B:
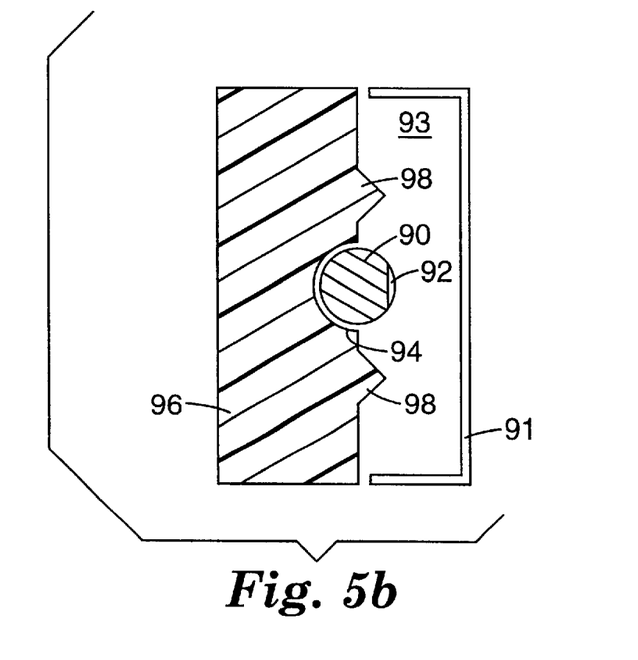

A method for making the mold of the present invention is shown in FIGS. 5(a) and 5(b). Referring to FIG. 5(a), in a first step a half-round rod 80, which may optionally be machined on all or a part of its surface, is attached to a support plate 82. The support plate 82 includes optional depressions 84 that will ultimately form alignment flanges in the mold portion to be formed. The plate 82 is attached to a channel 86, and the recess 88 is filled with a mold material to form a first mold portion. The mold material may vary widely depending on the intended application, and should preferably be flexible when fully polymerized. Suitable materials include, for example, elastomers such as silicone elastomers, which provide both elastic and release properties.

Next, referring to FIG. 5(b), a rod 90 machined on all or a part of its surface with structures 92 is placed in the molded cavity 94 in the first mold portion 96 formed in the first step. The mold portion 96 includes optional alignment flanges 98. The first mold portion 96 is then placed against a channel 91 and the space 93 is filled with a mold material to form a second mold portion. Several of the engagable molding portions may be joined together to make a continuous belt.

The rods 80, 90, as well as the channels 86, 91, may be made of a machineable material such as a metal or a hard polymer. Suitable metals include copper, nickel, aluminum, and alloys such as brass, stainless steel and the like. Suitable polymers include acrylics, carbonates, and any other polymer that retains its shape after machining.

Machining the rods 80, 90 may be performed by any known technique such as diamond turning, laser ablation, fly cutting or a combination thereof. Typically, to make structures of microscopic dimensions, the stock material is micro-machined using a diamond or carbide-tipped tool. The profile of the tip of the tool will be determined by the shape and dimensions of the structures desired in the rods 80, 90. Some more complex structures may require multiple passes with a tool or with separate tools to form the profile of a single structure. Known micro-machining techniques will reproduce surface structures accurately with precision approaching 0.001 $\mu$m.

The molding method of the invention is particularly useful for imparting structures onto a surface of a light guide, particularly structures that have at least one surface transverse to a longitudinal axis of the light guide. The method of the present invention makes possible the continuous molding of these structured light guides.

As an illustrative example, the method of the present invention may be used to make a light transmitting device (e.g., a light guide) including a fiber core having a plurality of light extraction structures extending into the core.

A light transmitting device may also include structures, referred to as extraction structures, on or in the core that cause the light traveling through the core to be transmitted outside of the device in controlled areas and at controlled intensities. Typical extraction structures are described in, for example, U.S. Pat. Nos. 5,432,876; 5,845,038; and 5,631,994, incorporated herein by reference.

Figure 6A:
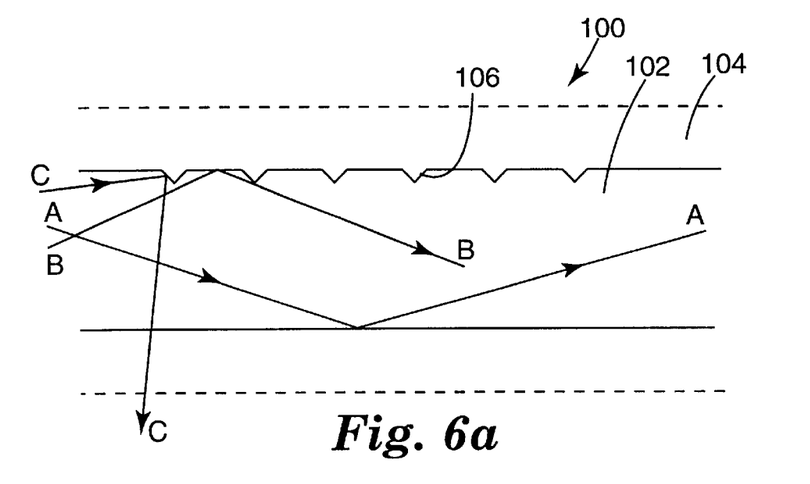
FIGS. 6(a) and 6(b) are schematic, cross sectional views of light guides that may be made using the process of the invention.

Referring to FIG. 6(a), a light guide 100 is shown having a core 102 and an optional cladding 104 (represented by the dashed lines in FIG. 6(a)). As used herein, "cladding" is defined as any material immediately adjacent the core having an index of refraction less than that of the core. The core 102 includes a plurality of extraction structures 106, in this example a series of precise optically smooth structures oriented transverse to the longitudinal axis of the core 102. As light travels through the core 102 from left to right in FIG. 6(a), ray A is reflected at the core/cladding interface and continues to propagate down the core 102. Ray B is incident at the core/cladding interface at a location between extraction structures 106 and is likewise reflected by total internal reflection. Ray C, however, is incident at the core/cladding interface on the optically smooth surface of extracting structure 106. The surface of the extraction structure 106 is angled relative to the surface of the core 102 so that when light rays such as ray C are incident at the surface of the structure, the rays are reflected through the cross-section of the core and transmitted through the surface of the light guide opposite the structure. The extraction structures 106 direct light out of the core 102 on the side opposite the structures themselves, so they are referred to herein as "back extraction" structures.

Figure 6B:
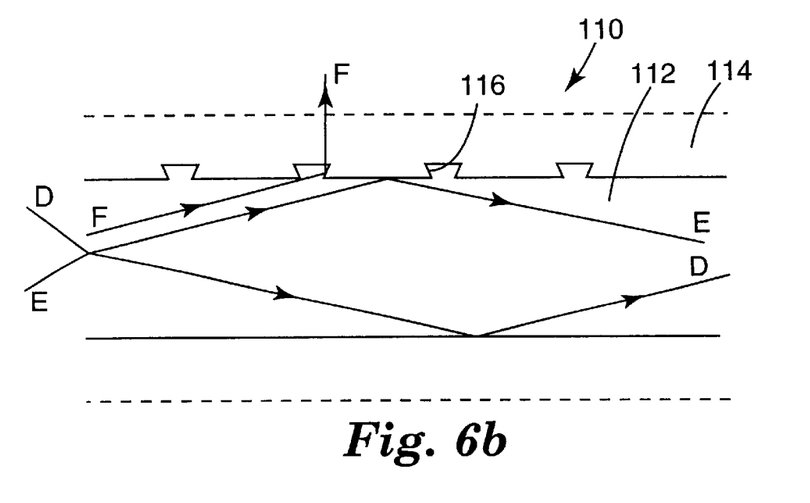

FIG. 6(b) shows a light guide 110 having a core 112, optional cladding 114, and front extraction structures 116 oriented transverse to a plane of a surface of the core 112. Rays D and E are reflected internally and continue to propagate down the core of the light guide 110. Ray F, however, is incident on the surface of light extraction structure 116 and is reflected at such an angle that it is transmitted through an adjacent surface of the extraction structure and out of the light guide 110. The extraction structures 116 direct light out of the core on the side including the structures, so they are referred to herein as front extraction structures. Both front extraction structures and back extraction structures may be negative, formed as indentions below the plane of the major surface of the light guide (as in FIG. 6(a)), or positive, as protrusions above the plane of the major surface of the light guide (as in FIG. 6(b)).

The method of the present invention may be used to make a light guide having a plurality of light extraction structures. When making a light guide, the material used for the mold is preferably a silicone elastomer such as, for example, elastomers available from Dow Corning, Midland, Mich., under the trade designation SYLGARD 184. The structures in the mold may be positive, negative, or a combination thereof. The type of extraction structures and the dimensions and geometry of the extraction structures are chosen based on the desired illumination properties of the final device. Various extraction structure dimensions and arrangements are disclosed in detail in U.S. Pat. No. 5,432,876, incorporated herein by reference. Typically, the structures in a light guide will have a notch-like appearance, and the notches will have a substantially V-shaped cross sectional shape with an included angle of about 10° to about 80° from the normal. The depth of the notches will normally be about 0.01 mm to about 0.1 mm, and the notches will be spaced center to center at a distance of about 0.1 mm to about 5 mm.

In addition, macroscopic components, such as electronic devices, may be placed in the mold and optically coupled to the light guide during the molding process. Examples of suitable electronic devices include light emitting diodes, lasers and the like.

When molding a light guide, the thermosettable material may be selected from any material that may be fully or partially polymerized into a substantially optically clear final article. In this application, the term "optically clear" refers to a material that has a transmission of at least 95% in a wavelength region of interest. As a general class of thermosettable materials, acrylates are preferred for their transparency properties. However, for many applications, a more flexible molded article is desired, so urethanes may be selected as the thermosettable material. Urethanes contract minimally during the polymerization step, although certain formulations may not be sufficiently transparent for use in an optical application. The preferred polyurethanes useful in the invention exhibit stability under prolonged exposure to light, particularly ultraviolet light, and are described in detail in U.S. Pat. No. 6,033,604, incorporated herein by reference.

Suitable urethanes include optically transparent polymerization reaction products of one or more polyisocyanates with one or more polyols. Preferred polyurethanes comprise flexible or rigid thermoset aliphatic polyurethanes. Useful aliphatic polyurethanes can be formed from reactions of polyester polyols with polyisocyanates and, optionally, chain extenders. The mole ratio of polyol:polyisocyanate:chain extender is preferably about 1:1:0 to about 1:15:14, more preferably about 1:1:0 to about 1:6:5.

Aliphatic polyurethanes useful in the invention can be prepared by first reacting the polyol and diisocyanate to form a prepolymer, then reacting the prepolymer with the chain extender, in a two-step process. Or, the polyurethane may be prepared by first blending the polyol and chain extender followed by addition of diisocyanate, in a one-pot method. The polyurethane preferably has a weight-average molecular weight preferably in the range of from about 60,000 to about 200,000.

Preferably, aliphatic polyurethanes useful in the invention include:

a) soft segments including isocyanate-terminated polyester polyol molecules with molecular weights of about 200 to 15,000;

b) optionally, hard segments including predominantly the reaction product of a chain extender with the isocyanate end-groups of the soft segments and additional polyisocyanate; and c) sufficient aliphatic polyisocyanate to react with essentially all of the polyester polyol and chain extender molecules present.

Hard segments may improve the strength and may increasing the refractive index of the polyurethane lightguide, as needed, provided that they do not adversely affect its light transmissive properties.

In addition to the urethane linkage, optionally there may be other linkages such as, for example, isocyanurates, biurets, allophanates, amides, or oxazolidones present in the thermosettable material formulation. In these instances, additional polyisocyanate beyond the amount previously described would be required, but the additional linkages cannot be present to such an extent that they would cause phase separation and light scattering, which reduce the effectiveness of the lightguide. In addition, plasticizers such as, for example, dibutyl adipate, catalysts such as, for example, dibutyl tin dilaurate, and other additives such as stabilizers and antioxidants may be added to the thermosettable material in amounts necessary to assure satisfactory product performance.

Aliphatic polyurethanes useful in the invention may be blended with other optically clear polymers, provided that the blend is compatible, or that the domains formed are small and do not scatter light, which would reduce the effectiveness of the resulting light guide.

The invention will now be described with reference to the following non-limiting example.

EXAMPLE

A light guide was prepared using the two piece mold of FIG. 5. The thermosettable material was a urethane with the formulation in Table 1 below. The thermosettable material, which included Part A and Part B at a ratio of 1:1, was mixed within 4 feet (1.2 m) of static mixer packing in a 7 foot (2.13 m) tube.

TABLE 1

|  | Part A | Part B |
| --- | --- | --- |
| CAPA 203 | 43.93 g | 556.1 g |
| CAPA 301 | 0 g | 150 g |
| DESMODUR-W | 351.6 g | 0 g |
| TOLONATE HDT-LV | 348.9 g | 0 g |
| DBTDA | 0.03 g | 2.15 g |

CAPA 203 and CAPA 201 are trade designations for polyols available from Solvay Interox, Houston, TX.
DESMODUR W is a trade designation for a diisocyanate available from Bayer Corp. Pittsburgh, PA.
TOLONATE is a trade designation for a tri-isocyanate available from Rhone Poulenc Chemical Co., Cranbury, NJ.
DBTDA is a dibutyl tin dilaurate catalyst available from Aldrich Chemical Co., Milwaukee, WI.

The mold, which was constructed as a continuous belt made of silicone, included an upper portion and a lower portion. The molding cavities in the belt had a cross section 12.5 mm in diameter, and included 200 structures per 30.5 cm length. The structures were optically smooth notches with a V-shaped cross sectional shape and had a depth of 0.35 mm and an included angle of 105°.

The continuous belt was set to move at a rate of about 93 cm/min, which provided a mold volume of about 102.8 $cm^3$/min. The polymerization time for the urethane was about 40 seconds after it left the nozzle and entered the closed mold portion of the molding belts.

Approximately 40 feet (12.2 m) of urethane extraction fiber was molded. Replication from the mold was excellent, with similar results to that obtained from a batch molding process.

A number of embodiments of the invention have been described. Nevertheless, it will be understood that various modifications may be made without departing from the spirit and scope of the invention. Accordingly, other embodiments are within the scope of the following claims.

What is claimed is:

1. A method of fabricating an elongate light guide, comprising:

(a) providing a moving mold assembly comprising at least two mold parts, wherein the mold parts have an engaged portion and a non-engaged portion;

(b) moving the mold parts such that the non-engaged portions move in a first direction and the engaged portions move in a second direction different from the first direction to form an elongate regenerated mold cavity having a longitudinal axis, wherein the cavity comprises a molding surface with at least one structure transverse to the longitudinal axis;

(c) introducing a thermosettable material into the cavity;

(d) at least partially polymerizing the thermosettable material in the cavity to form a light guide therein; and, (e) removing the light guide from the mold assembly.

2. The method of claim 1, wherein the mold assembly comprises two mold parts.

3. The method of claim 2, wherein the mold parts move continuously.

4. The method of claim 2, wherein the mold parts move discontinuously.

5. The method of claim 2, wherein the mold parts are endless belts.

6. The method of claim 2, wherein the mold parts are advanced synchronously at a rate sufficient to fully polymerize the thermosettable material in the cavity.

7. The method of claim 1, wherein the structure comprises at least one optically smooth surface.

8. The method of claim 1, wherein the thermosettable material is introduced into a first end of the cavity at a rate sufficient to allow continuous operation of the mold portions and simultaneous removal of the light guide from a second end of the cavity.

9. The method of claim 5, wherein said belts are elastomeric.

10. The method of claim 5, wherein said belts comprise a silicone.

11. The method of claim 1, wherein the thermosettable material is polymerized using a method selected from the group consisting of radiation, electron beam, chemical and thermal methods.

12. The method of claim 1, wherein the thermosettable material is selected from the group consisting of reactive silicones, urethanes, and acrylics.

13. The method of claim 12, wherein the thermosettable material is a urethane copolymer.

* * * * *